United States Patent [19]

Mills

[11] 3,817,353
[45] June 18, 1974

[54] OIL LEVEL CONTROL SYSTEM HAVING HIGH TEMPERATURE ACTUATED SHUT-OFF VALVES

[76] Inventor: Kenneth N. Mills, 3865 S. Florence Ave., Tulsa, Okla. 74105

[22] Filed: June 25, 1970

[21] Appl. No.: 49,641

[52] U.S. Cl. .................. 184/6.4, 137/75, 184/1 B
[51] Int. Cl. .................. F01m 11/10, F16k 17/38
[58] Field of Search .................. 137/72–77; 123/196 S; 184/1 B, 6.4, 68, 103 A

[56] References Cited
UNITED STATES PATENTS

| | | |
|---|---|---|
| 1,251,489 | 1/1918 | Essen .................. 137/75 |
| 1,659,859 | 2/1928 | Cox .................. 184/103 A |
| 1,732,605 | 10/1929 | Keenan .................. 137/77 X |
| 1,791,354 | 2/1931 | Fuqua .................. 137/72 X |
| 1,834,645 | 12/1931 | Ryan .................. 137/76 |
| 1,896,019 | 1/1933 | Schweizer .................. 137/75 |

Primary Examiner—William R. Cline
Assistant Examiner—Richard Gerard
Attorney, Agent, or Firm—Head & Johnson

[57] ABSTRACT

An oil level control device for controlling the level of oil in an engine crankcase incorporates thermoactuated shut-off valves for abrogating oil leakage in the event of a fire.

1 Claim, 2 Drawing Figures

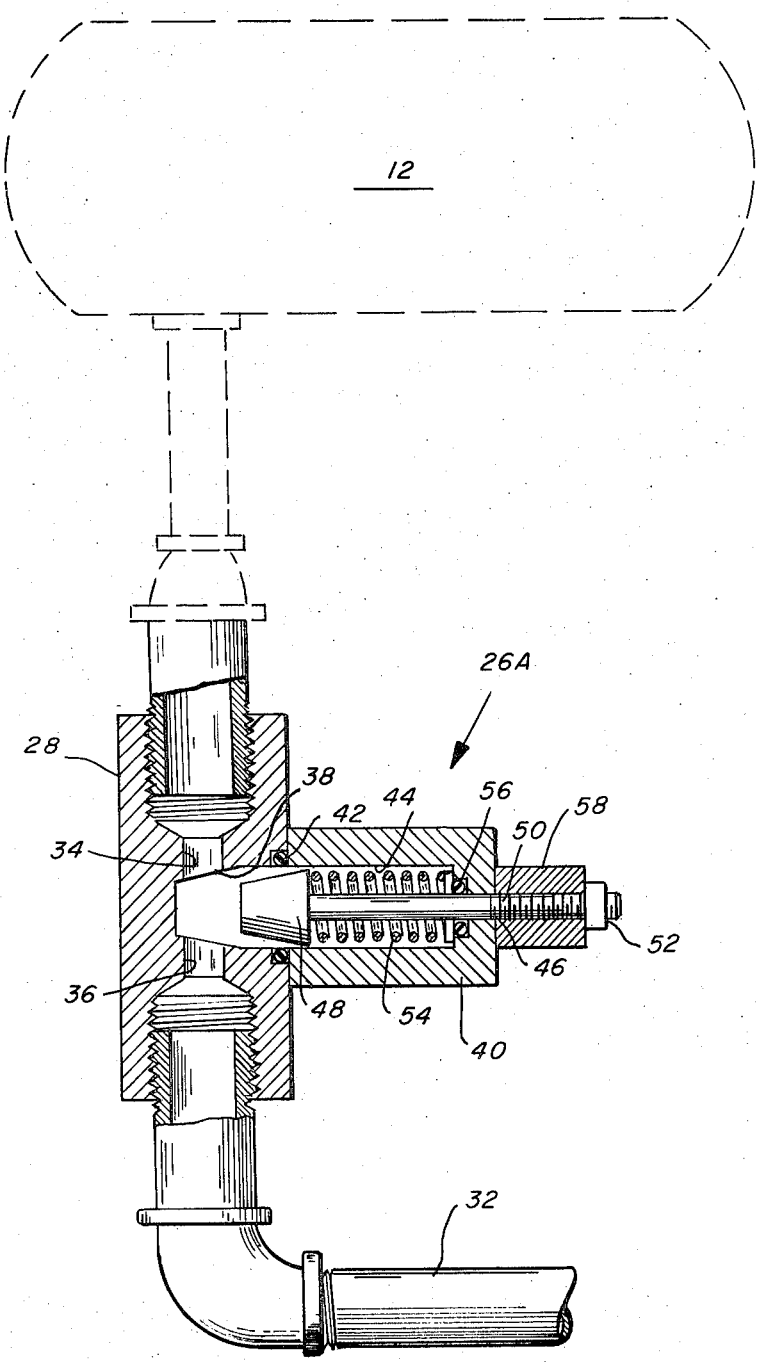
FIG. IA
INVENTOR.
KENNETH N. MILLS

OIL LEVEL CONTROL SYSTEM HAVING HIGH TEMPERATURE ACTUATED SHUT-OFF VALVES

BACKGROUND OF THE INVENTION

Presently manufactured process machinery such as compressor engines often utilize automatic oil level regulating systems for controlling the oil level in the engine crankcase. These automatic oil level regulating systems are the only unprotected source of combustible material in the event of an engine room fire.

Present automatic oil level control systems are commonly fabricated from relatively low melting point material and in most instances have windows for visual gauging of the oil level. These windows which are usually made either from plastic or glass, are susceptible to fire damage. In the event of damage to the oil level control device, combustible oil can leak both from the oil supply reservoir and also from the engine crankcase. This leaking oil intensifies and perpetuates the fire.

It is therefore an object of this invention to present an automatic oil level regulating system incorporating thermosensitive shut-off valves for shutting in the oil supply reservoir and the oil in the engine crankcase in the event of a fire.

SUMMARY OF THE INVENTION

Generally the oil level regulating system of this invention comprises a float-operated valve inserted in a fluid control line between an oil supply reservoir and a crankcase. The oil level regulating system incorporates a thermoactuated valve between the control device and the oil supply reservoir and also such a valve between the engine crankcase and the control device.

DESCRIPTION OF THE DRAWINGS

FIG. 1A is a partial cross-sectional view of the oil regulating system of this invention specifically showing the components of one of the thermoactuated valves thereof.

DETAILED DESCRIPTION OF THE PREFERRED EMBODIMENT

Figure 1B:
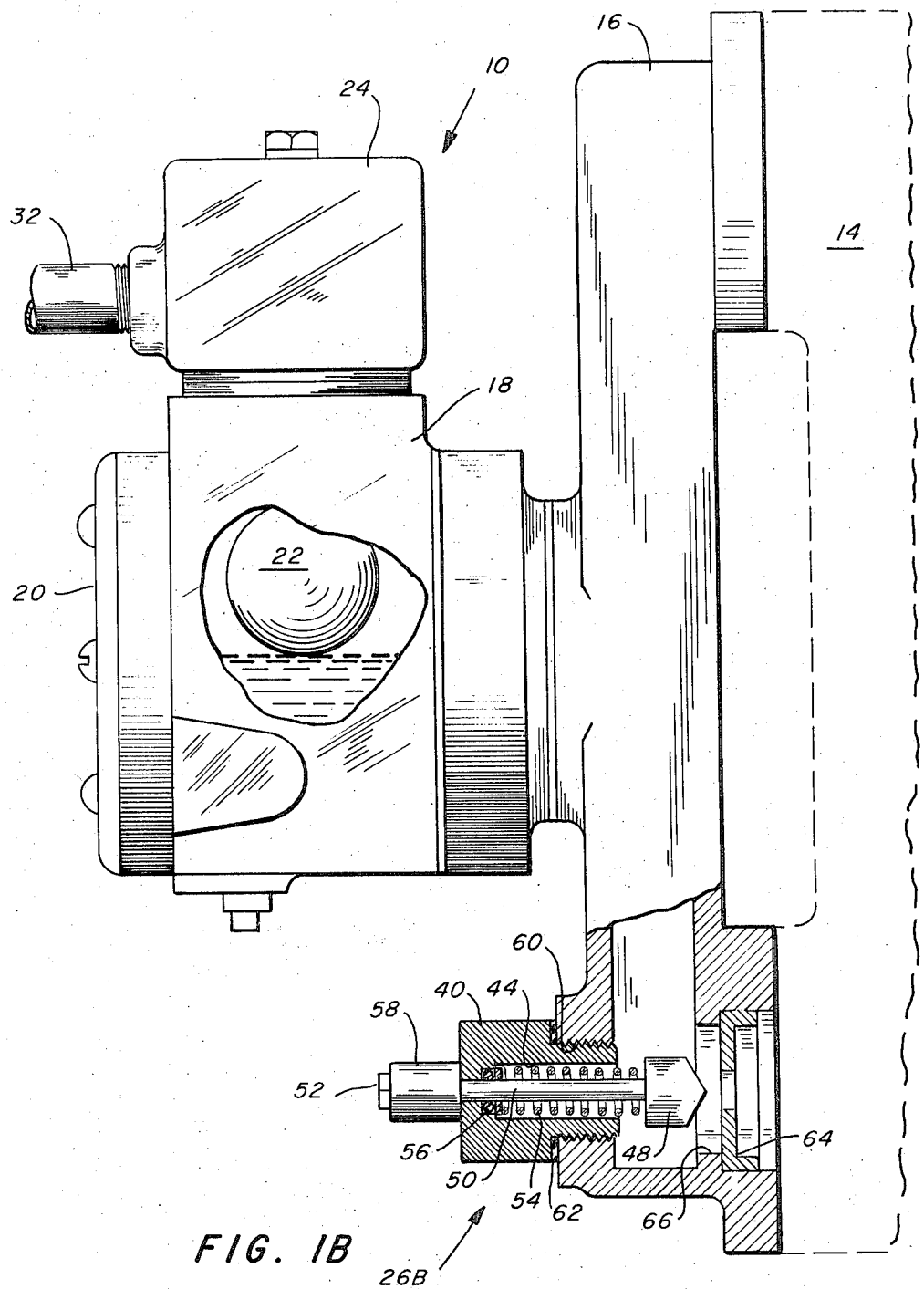
FIG. 1B is a partial cross-sectional view of a portion of the oil regulating system of this invention showing various components thereof.

Turning now to FIGS. 1A and 1B of the drawings, there is shown an automatic fail safe level control regulating system denoted generally as the numeral 10 which is inserted between an oil supply reservoir 12 and a process equipment member such as an engine crankcase 14 both shown in phantom in the drawings. Even though the detailed description of the preferred embodiment referes specifically to a regulation of the oil level in an engine crankcase, it is to be understood that the level control regulating system of this invention will function just as easily with other machinery as well as other fluid media. The oil supply reservoir 12 supplies oil to the crankcase when needed and may be located anywhere. The reservoir 12 can utilize a variety of methods conducting the oil to the crankcase such as gravity flow or with the reservoirs located underground a pump.

The flow of oil from the oil supply reservoir 12 to the engine crankcase 14 is controlled and regulated by level control system 10. An adapter 16 possessing upper and lower flanges directly bolted to crankcase 14 includes an internal oil passageway which enables a portion of the crankcase oil to flow into a float chamber 18 and to assume therein a level corresponding to the level of oil within the crankcase. A transparent window 20 allows visual gauging of the oil level within the chamber. A float 22 disposed within float chamber 18 responds to the oil level therewithin and controls the opening and closing of a valve located between chamber 18 and housing 24. The inlet of the valve is fluidly interconnected to an oil supply reservoir 12 and the outlet thereof discharges oil into float chamber 18 when the valve is open.

The components of the level control system discussed to this point constitute the working parts of the system under normal conditions and maintain the level of oil in the crankcase within a predetermined differential. However as beforementioned under abnormal conditions such as exist when a fire occurs in the vicinity of the regulating system, the system in general and especially the float chamber and window thereof are susceptible to melting or other damage and can provide a continuous stream of oil from both the crankcase and the oil supply reservoir to intensify and perpetuate the fire.

In order to abrogate the possibility of this aforesaid oil leakage, a thermoactuated valve 26A is inserted between the oil supply reservoir 12 and valve housing 24 and a second thermoactuated valve 26B is inserted between the float chamber 18 and the crankcase 14.

Turning now to valve 26A, a body 28 which may be of any suitable heat resistant material such as steel includes an annular longitudinal port having an inlet 34 and an outlet 36. Both the inlet and outlet contain therein female threads which threadably engage male threads on fluid carrying conduits and couple the valve at the inlet to the oil supply reservoir 12 and at the outlet to the float controlled valve, between housing 24 and chamber 18, through conduit 32. The central portion between the inlet 34 and outlet 36 includes a transverse valve seat 38. Appropriately secured to body 28 normal to the axis thereof is a housing 40. An O-ring 42 or other type seal is received in a recess on body 28 to seal the juncture with the housing 40. Housing 40 embodies an open ended recess 44 coaxial with valve seat 38 and communicating therewith to form a valve chamber. The outer end of housing 40 has cut therein a central transverse aperture 46.

Longitudinally received within recess 44 and adapted for sliding movement therein is a plunger 48 shaped to conform to valve seat 38. A stem 50 extends rearwardly from the plunger 48 through aperture 46 and contains threads on the outer end thereof to receive a nut 52.

Sleeved over stem 50 within recess 44 is a helical spring 54 which inwardly biases plunger 48 towards valve seat 38. A tubular washer introduced over stem 50 at the rearward end of spring 54 serves as an abutment member for the spring. A second compliant O-ring or seal, 56, is disposed at the inner surface of stem housing 40 to seal between the stem and housing 40.

A tubular fuse link 58 is threaded or otherwise coaxially received over stem 50 between the outer end of the housing 40 and nut 52. Tubular fuse link 58 is constructed of an eutectic material having a relatively low melting point such as solder. The fuse link is exposed to the ambient temperature surrounding the valve and in the event of a fire melts to permit plunger 48 to shut in the valve under the bias of the spring 54.

Looking now at the lower end of the adapter as shown in FIG. 1B, valve body 26B is inserted between the engine crankcase and the oil control device. The lower end of the adapter includes a transverse threaded opening 60 and serves to connect the housing 40 of the valve 26B to a manifold adapter 16. A seal 62 may be used to assure a sealed tight fit between the adapter and the housing. As in valve 26A, a plunger 48 is longitudinally received within the housing and a stem 50 extends exteriorly of housing 40. A fuse link 58 is threaded or otherwise received over stem 50 and in normal operation withholds the plunger from engaging a valve seat which is formed by an annular tubular insert 64 disposed over the adapter outlet 66. The arrangement of a plunger spring and other components of valve 26B are similar to that discussed previously in regards to valve 26A.

Under normal operation, fuse link 58 on both valves 26A and 26B withholds the plungers from the valve seats and oil can flow through valves unimpeded. Flow control valve between housing 24 and chamber 18 regulates and supervises the flow of oil from a supply reservoir 12 to the crankcase. In the event of a fire in the vicinity of valves 26A and 26B, fuse links 58 melt to allow the bias of spring 54 to force the plungers into their respective seats thereby preventing any leakage of oil into the fire. The temperature at which the fuse links melt can be adjusted by the use of a different melting-point material and for example in normal applications, solder having a melting point of around 360°F is deemed acceptable. Since the fuse links are exposed, maximum sensitivity is attained and visual inspection is permitted.

During the detailed description of the preferred embodiment specific language has been used for the sake of clarity, however, it is to be understood that such words are not words of limitation and include all equivalents which operate in a similar manner to accomplish a similar purpose. For example, although the valves have been discussed as being connected adjacent the oil flow control valve and adapter, it is evident that other valves can be inserted in the system at points susceptible to fire damage.

What is claimed is:

1. An oil flow safety shut-off system for shutting off the flow of oil from an oil supply reservoir used to maintain an operative oil level in the crankcase of a prime-mover comprising:

a float chamber positioned at the same elevation of said crankcase oil level;

first conduit means to supply oil from said reservoir to said float chamber;

second conduit connecting said float chamber to said crankcase at a point below said operative crankcase oil level;

a float operated valve in said float chamber to control flow of oil from said reservoir to maintain said operative crankcase oil level;

a first normally open valve in said first conduit thermally operative to shut off flow of oil from said reservoir to said float chamber; and a second normally open valve in said second conduit adjacent said point of connection with said crankcase, said valve thermally operative to shut off flow of oil from said crankcase in case of fire or excess heat.

* * * * *